Patented May 13, 1941

2,241,376

UNITED STATES PATENT OFFICE 2,241,376

MODELING COMPOUND

Dorothy Chase Carter, Brighton, Mass.

No Drawing. Application December 5, 1939,
Serial No. 307,715

1 Claim. (Cl. 106—39)

This invention relates to a modeling compound designed primarily for use in school work although it obviously can be used at any time for entertaining purposes or for commercial purposes.

An object of the invention is to provide a powdered mixture which can be suitably colored, if desired, and which, when treated by a predetermined method, will form a solid, putty-like mass which, if properly sealed, can be kept indefinitely until such time as it is to be molded into desired shapes.

With the foregoing and other objects in view the invention consists of the following ingredients substantially in the proportions stated and combined by the method set forth, it being understood that changes may be made in the invention as described without departing from the spirit of the invention as set forth in the appended claim.

The mixture includes

| | |
|---|---|
| Salt (NaCl) | One cup full |
| Corn starch | One-third cup |
| Cold water | One-half cup |

In preparing the ingredients the salt and corn starch are mixed together and, if the compound is to be colored, a suitable vegetable coloring matter is added to the mixture of salt and corn starch and blended thoroughly therewith. The water is then added and the mixture stirred thoroughly after which said mixture is slowly heated while being stirred until, after about three and one-half minutes, said mixture suddenly assumes a solid putty-like mass. The mixture is then removed from the heating means and, while still warm, is packed into a suitable container and sealed after which it can be used at any time for modeling purposes.

If a mixture of fine texture is desired such as might be used in modeling flowers, leaves, etc., finely divided salt, better known as "table salt," is used. Where large objects are to be molded, however, a coarse and cheaper salt could be employed such as commonly used for cooking purposes.

The dry ingredients are supplied to the purchaser with directions for preparing the compound for use or, if desired, the properly prepared compound can be supplied to the trade in sealed containers.

It has been found that the mixture produced from the ingredients stated can be easily shaped into various objects such as the heads of puppets, animal heads, leaves, flowers, and, in fact, all kinds of objects useful for ornamental or educational purposes.

What is claimed is:

A putty-like, inadhesive material for use as a modeling compound consisting of the following ingredients substantially in the proportions stated, namely, salt (NaCl) one cup full; corn starch, one-third cup full and water, one-half cup full.

DOROTHY CHASE CARTER.